(12) United States Patent
Chu et al.

(10) Patent No.: US 11,509,703 B2
(45) Date of Patent: Nov. 22, 2022

(54) SYSTEM AND METHOD FOR WIDESCALE ADAPTIVE BITRATE SELECTION

(71) Applicant: VMware, Inc., Palo Alto, CA (US)

(72) Inventors: Tianshu Chu, Palo Alto, CA (US); Rakesh Misra, Palo Alto, CA (US); Sandeep Chinchali, Palo Alto, CA (US); Alexandros Anemogiannis, Palo Alto, CA (US); Rahul Tandra, Palo Alto, CA (US); Kanthi Nagaraj, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 358 days.

(21) Appl. No.: 16/582,089

(22) Filed: Sep. 25, 2019

(65) Prior Publication Data

US 2020/0099733 A1    Mar. 26, 2020

Related U.S. Application Data

(60) Provisional application No. 62/834,851, filed on Apr. 16, 2019, provisional application No. 62/736,691, filed on Sep. 26, 2018.

(51) Int. Cl.
*H04L 65/70* (2022.01)
*G06N 3/08* (2006.01)
(Continued)

(52) U.S. Cl.
CPC ............... *H04L 65/70* (2022.05); *G06N 3/08* (2013.01); *H04L 65/75* (2022.05); *H04N 19/59* (2014.11);
(Continued)

(58) Field of Classification Search
CPC . H04L 65/607; H04L 65/601; H04L 65/4084; H04L 65/605; H04L 65/80;
(Continued)

(56) References Cited

U.S. PATENT DOCUMENTS

| | | | | |
|---|---|---|---|---|
| 2014/0095943 A1* | 4/2014 | Kohlenberg | .......... | G06F 11/004 714/47.3 |
| 2016/0065995 A1* | 3/2016 | Phillips | ................. | H04L 1/0014 725/62 |

(Continued)

FOREIGN PATENT DOCUMENTS

| | | | | |
|---|---|---|---|---|
| WO | WO 2021013368 A1 * | 7/2019 | | |
| WO | WO-2020175866 A1 * | 9/2020 | ........... | G06K 9/6262 |

OTHER PUBLICATIONS

Huang et al, Title: "QARC: Video Quality Aware Rate Control for Real-Time Video Streaming based on Deep Reinforcement Learning", MM'18, Oct. 22-26, 2018, Seoul, Republic of Korea, p. 1208-1216 (Year: 2018).*

*Primary Examiner* — Kevin T Bates
*Assistant Examiner* — Ranjan Pant
(74) *Attorney, Agent, or Firm* — Clayton, McKay & Bailey, PC

(57) ABSTRACT

A system and method for training and executing an adaptive bitrate (ABR) controller can include clustering content into content clusters based on content metadata, clustering network scenarios based on network information, normalizing input measurements, training the ABR controller for each content within at least one of a given content cluster and a given network scenario cluster by determining network information and network metadata, associated with the respective content, determining a content bitrate, determining a reward associated with the content bitrate, and training the ABR controller based on the reward.

18 Claims, 8 Drawing Sheets

(51) Int. Cl.
*H04N 21/2662* (2011.01)
*H04N 21/2385* (2011.01)
*H04N 19/59* (2014.01)
*H04L 65/75* (2022.01)

(52) U.S. Cl.
CPC ..... *H04N 21/2385* (2013.01); *H04N 21/2662* (2013.01)

(58) Field of Classification Search
CPC .......... G06N 3/08; G06N 7/005; G06N 5/003; G06N 3/006; G06N 20/10; H04N 21/2662; H04N 19/59; H04N 21/8456; H04N 21/251; H04N 21/2402; H04N 21/2401; H04N 21/2385
See application file for complete search history.

(56) References Cited

U.S. PATENT DOCUMENTS

| | | | |
|---|---|---|---|
| 2016/0308958 A1* | 10/2016 | Navali | H04L 65/60 |
| 2017/0279847 A1* | 9/2017 | Dasgupta | H04L 41/147 |
| 2017/0316342 A1* | 11/2017 | Franc | G06N 20/10 |
| 2018/0357556 A1* | 12/2018 | Rai | G06N 20/00 |
| 2019/0020901 A1* | 1/2019 | Ananthapur Bache | H04N 19/70 |
| 2019/0147355 A1* | 5/2019 | Rennie | G06N 5/046 706/47 |
| 2019/0238390 A1* | 8/2019 | Martin | H04N 21/631 |
| 2019/0327510 A1* | 10/2019 | Kalagi | H04N 21/8543 |
| 2019/0334803 A1* | 10/2019 | Ickin | H04L 65/4092 |
| 2020/0067852 A1* | 2/2020 | Sen | H04N 19/00 |

\* cited by examiner

SYSTEM AND METHOD FOR WIDESCALE ADAPTIVE BITRATE SELECTION

CROSS-REFERENCE TO RELATED APPLICATIONS

This application claims the benefit of U.S. Provisional Application No. 62/736,691, filed Sep. 26, 2018 and US Provisional Application No. 62/834,851, filed Apr. 16, 2019, both of which are incorporated in their entirety by this reference.

TECHNICAL FIELD

This invention relates generally to the digital media field, and more specifically to a new and useful system and method in the digital media field.

BACKGROUND

Until recently, the main method of streaming multimedia content such as video was through predictable, high-bandwidth links (e.g., satellite and cable). The video was available at very high resolutions and was streamed over a dedicated bandwidth link to each individual subscriber.

In the past decade or so, however, the primary medium of consumption of multimedia has changed from these predictable, high-bandwidth links to the public internet, where the bandwidth is not just lower on average, but also less predictable. Many viewers have opted to watch video over their LTE networks or over their wireless (wi-fi) networks. This has led to a different way of consuming video than what viewers were accustomed to ten or twenty years ago, when it was common to watch streaming video over a satellite connection.

One significant problem with streaming video over public networks is that bandwidth is no longer guaranteed. The bandwidth can fluctuate based on a number of reasons, such as what network plan you're on, how many other users are using the network bottlenecks, and rain as well as other weather conditions. The medium over which content was being delivered to the end users has thus changed from being a medium with dedicated guaranteed bandwidth, to a medium with much less predictable bandwidth.

With unpredictable bandwidth, streaming multimedia content is sometimes difficult and suboptimal. In a typical scenario, the bandwidth "drops" the content, the content doesn't make its way to the user in time, and as a result the user will see stalled content. To handle this, the community introduced adaptive bitrate algorithms (ABR), which are designed to dynamically adapt the bitrate of a multimedia stream in real time based on current conditions (e.g., current bandwidth conditions). Rather than streaming at a single fixed resolution, the algorithms adapt the resolution at which the video is being streamed in real time.

A significant downside of traditional ABR algorithms is that they do not directly optimize for user experience (e.g., video quality) or user engagement (e.g., users' streaming behavior, users' watch time, total playback time, etc.). Instead, the algorithms are created manually and involve simplifying assumptions into a set of fixed rules based on thresholds and heuristics.

To resolve these shortcomings, two main techniques have been introduced: MPC-based ABR algorithms and DNN-based ABR algorithms. The model predictive control (MPC)-based ABR algorithms predict the future available bandwidth and are designed using a network prediction model and solving an explicit QoE optimization problem over a horizon of future video segments. However, the network prediction model employed by MPC-based ABR algorithms rely on simplified assumptions and oftentimes fail in real-world scenarios where such assumptions do not hold. As such, MPC-based ABR algorithms require rigorous monitoring and maintenance on the field. Furthermore, MPC optimization is sensitive to the video properties (e.g., encoding levels, segment duration, etc.), and may not generalize across the vast array of video content typically offered by a major OTT provider.

The deep neural network (DNN)-based ABR algorithms are trained on network data (e.g., representing network scenarios where the ABR algorithms are expected to be deployed, using simulated data, etc.) using deep learning (e.g., deep reinforcement learning). However, the resulting ABR algorithm suffers from the tradeoff between optimality and generality common to any data-driven model. Namely, the ABR model works fairly well across the wide variety of network scenarios represented in the training dataset, however it's performance for any specific network scenario is suboptimal. In addition, training an ABR model using this approach typically requires assuming a fixed set of multimedia properties, which means a given ABR model does not work well (or does not work at all) for a video content with different properties.

This can be particularly relevant in conventional OTT streaming scenarios, where a typical over-the-top (OTT) streaming service (e.g., Netflix, DirectTV, etc.) supports a large family of multimedia content with very different multimedia properties across the family, and the content is consumed in a very wide variety of network scenarios. As such, a wide diversity in content and network scenarios exist and must be accommodated for. While training a single model for all scenarios is possible, the performance of such models is oftentimes poor (e.g., has poor recall or precision, due to partial observability in reinforcement learning), due to the high scenario variability. Furthermore, training a different model for each scenario is oftentimes impractical due to the volume of models required, and the lack of edge case data. Thus, one outstanding key challenge is to determine the number of different scenarios for which separate ABR models 'need' to be trained, and identify/classify each scenario: if all the necessary scenarios are not identified separately, the ABR models will continue to be suboptimal; on the other hand, if the problem is split into too many scenarios, an unnecessarily high number of ABR models need to be trained and maintained, also there may not exist sufficient data to train a robust ABR model for each identified scenario.

The current machine learning approaches do not optimize for user engagement (e.g., user watch time, user abandonment rate, total playback time, average churn rate, total active users, etc.), which are metrics that drive business and revenue for OTT service providers. The relationship between user experience and user engagement (e.g., poor video quality leading to user churn; high rebuffering ratio leading to a user to abandon playback; behavior changes depending on the content they are watching, the device they are watching on, etc.; etc.) is complex and not well understood. Because of this complexity, existing MPC- or DNN-based ABR algorithms make simplistic assumptions about user behavior and/or user preferences and choose a fixed "objective function" for user experience metrics. As a result, existing ABR models do not optimize for user engagement.

Thus, there is a need in the digital media field to create an improved system and method which provides dynamic ABR for content streaming in a way that optimizes for both user experience and user engagement. The source of the problem, as discovered by the inventors, is a lack of ABR selection that is optimized for user experience and user engagement across a wide variety of multimedia content and network conditions.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
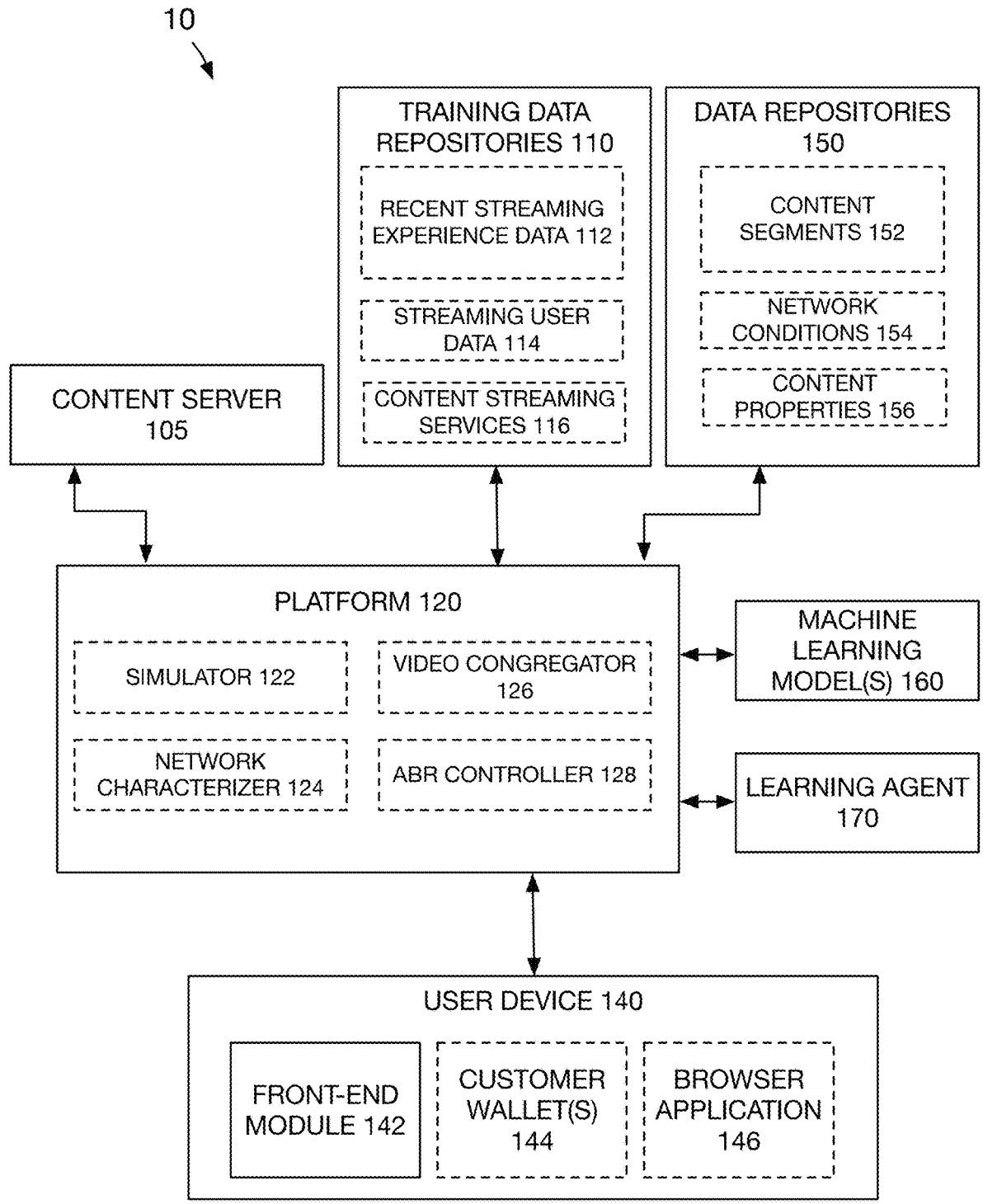
FIG. 1 is a schematic representation of the system.

As shown in FIG. 1, the ABR selection system can include: a content server 105; training data repositories 110 with optional repositories for recent streaming experience data 112, streaming user data 114, and content streaming services 116; data repositories 150 with optional repositories for content segments 152, network conditions 154, and content properties 156; a platform 120 optionally containing a simulator 122, network characterizer 124, content congregator 126, and ABR controller 128; machine learning model(s) 160; a learning agent 170; and/or a client device or user device 140, containing a front end module 142, optional customer wallet(s) 144, and optional browser application 146. The ABR selection system functions to: determine a generalized ABR controller for use in a plurality of network conditions and for a plurality of content properties.

Figure 2A:
FIGS. 2A and 2B are schematic representations of embodiments of the method.
Figure 2A:
Figure 2B:
Figure 2B:

As shown in FIGS. 2A and 2B, the method for ABR selection can include: training the ABR controller; and optionally, determining a content streaming bitrate. Training the ABR controller can include determining network information; determining network scenario cluster(s); determining content cluster(s); determining a training bitrate; and determining a normalized reward.

In a specific embodiment of the technology, a user device can access a content server (e.g., over-the-top (OTT) content provider, using an application associated with OTT provider, etc.) to stream content. The content server or application requests a bitrate (e.g., for the next segment of the content, for future segments of the content, etc.) from the ABR controller, which can be part of the content server or application, or be a separate component. The ABR controller determines a bitrate based on network data, content data, and/or user data. The bitrate is provided to the content server or application. The user device streams the content (e.g., future content segments) at the provided bitrate (e.g., requests the future content segments at the provided bitrate). The process can be repeated for the subsequent segments of the content. However, the technology can be used in any suitable manner.

In a preferred embodiment, after building an ML model and training a learning agent based on the ML model, the learning agent is deployed in real time while content streaming is performed on a user device running a content player application. Every time the client finishes downloading a content segment, the learning agent is invoked, makes a predictive decision of a bitrate selection, receives the next segment at the selected bitrate, and downloads the next segment. The learning agent is then optionally invoked again. The learning agent can execute arbitrarily in this fashion until the content streaming ends (e.g., through user termination, content ending or any other suitable means for content streaming to end). For example, the learning agent is invoked every few seconds for a non-uniform number of seconds each time, depending on the time taken to download the next segment.

2. Benefits.

Variations of the technology can confer several benefits and/or advantages.

First, the system and method directly optimize ABR for user engagement, such that ABR can be selected based on predictive models of user streaming behaviors (e.g., abandoning of video if it rebuffers over time). Modeling user behavior and factoring user behavior into the selection of the ABR can lead to the ABR being more closely tied to a user's experiences and engagement and can more closely model outcomes that are optimal for user quality of experience and user engagement.

Second, the systems and methods lead to a better quality of user experience and user engagement across a wide variety of network scenarios and video content by training the ABR controller using a normalized QoE as the reward and using an enhanced state space (e.g., normalized inputs; clustering content based on network scenario, content metadata, etc.; etc.). Any large OTT video service has subscribers who are streaming a wide variety of content with different visual and encoding properties, in a wide variety of network scenarios with different underlying behavior. This invention's ability to personalize the ABR algorithm to each piece of content and each network scenario results in optimal quality of experience (QoE) and engagement in all scenarios, without training a separate ABR algorithm for each scenario.

Third, from a commercial perspective, prospective users are more willing to pay for a premium multimedia streaming service with a reputation for consistently delivering quality streaming content, with a minimum of dropped and/or stalled video and other issues. Users watch content for a longer period of time and their attention is captured for longer stretches, which results in less user churn (e.g., users abandoning a stream midway through). This all translates to higher revenues for a service provider.

Fourth, this method confers several benefits over conventional methods by generalizing the machine learning-based approaches (e.g., the reinforcement-learning approaches) to a plurality of network and content scenarios, while optimizing directly for OTT providers' key performance metrics (e.g., user engagement) in addition to lower-level user experience metrics (e.g., QoE). First, the method enables the ABR model to be more quickly and easily designed and updated. Second, the method can be less expensive to design, since the method uses existing network and content data (e.g., from OTT providers) and leverage machine learning methods, thereby reducing the need for domain experts to manually design and monitor each model. Third, the method can result in better-performant model(s), since machine learning is used to learn a near-optimal algorithm instead of relying on potentially flawed assumptions and heuristics.

Fifth, costwise, the system lowers operational costs for a service provider, since the service provider has to maintain only a few machine learning models.

However, variants of the technology can confer any other suitable benefits and/or advantages.

3. System.

The system preferably functions to determine a bitrate for streaming content (e.g., near-optimal bitrate for content streaming). The system is preferably hosted on a computing system (e.g., remote server, cloud, etc.); however, the system can be hosted on a user device, and/or on any suitable device. The output bitrate (e.g., near-optimal bitrate) can depend on the user, the network (e.g., associated with the user, associated with the content, etc.), the content, and/or any suitable component. The output bitrate can be optimized based on: quality of experience (QoE) (e.g., key performance indicator (KPI) such as rebuffering duration, rebuffering frequency, time since content start, time since last rebuffering, time to first rebuffering, etc.; video quality; quality switches; etc.), quality of engagement (e.g., likelihood of abandoning a playback session, likelihood of churning, etc.), recent throughput measurements, playback buffer state, recent segment download times, recent rebuffering events (e.g., duration, count, frequency etc.), recent bitrate(s) selected, time since playback start, time of day, network type (e.g., WiFi, LTE, etc.), content type (e.g., live video, on-demand video, news, sports, animation, etc.), device type (e.g., smartphone, TV, computer, etc.), content delivery network (CDN) type/ID (e.g., Akamai, Limelight, etc.), playback buffer settings (e.g., minimum buffer for playback start, minimum buffer to resume playback after rebuffering, maximum buffer, etc.), content properties (e.g., bitrate ladder, segment duration etc.), wait time (e.g., time a user waits before beginning content), content compression method, and/or any suitable parameters. The parameters used to determine the output bitrate can change during content streaming, vary over time, remain constant (e.g., during content streaming, over time, etc.), and/or can vary in any suitable manner.

Figure 8:
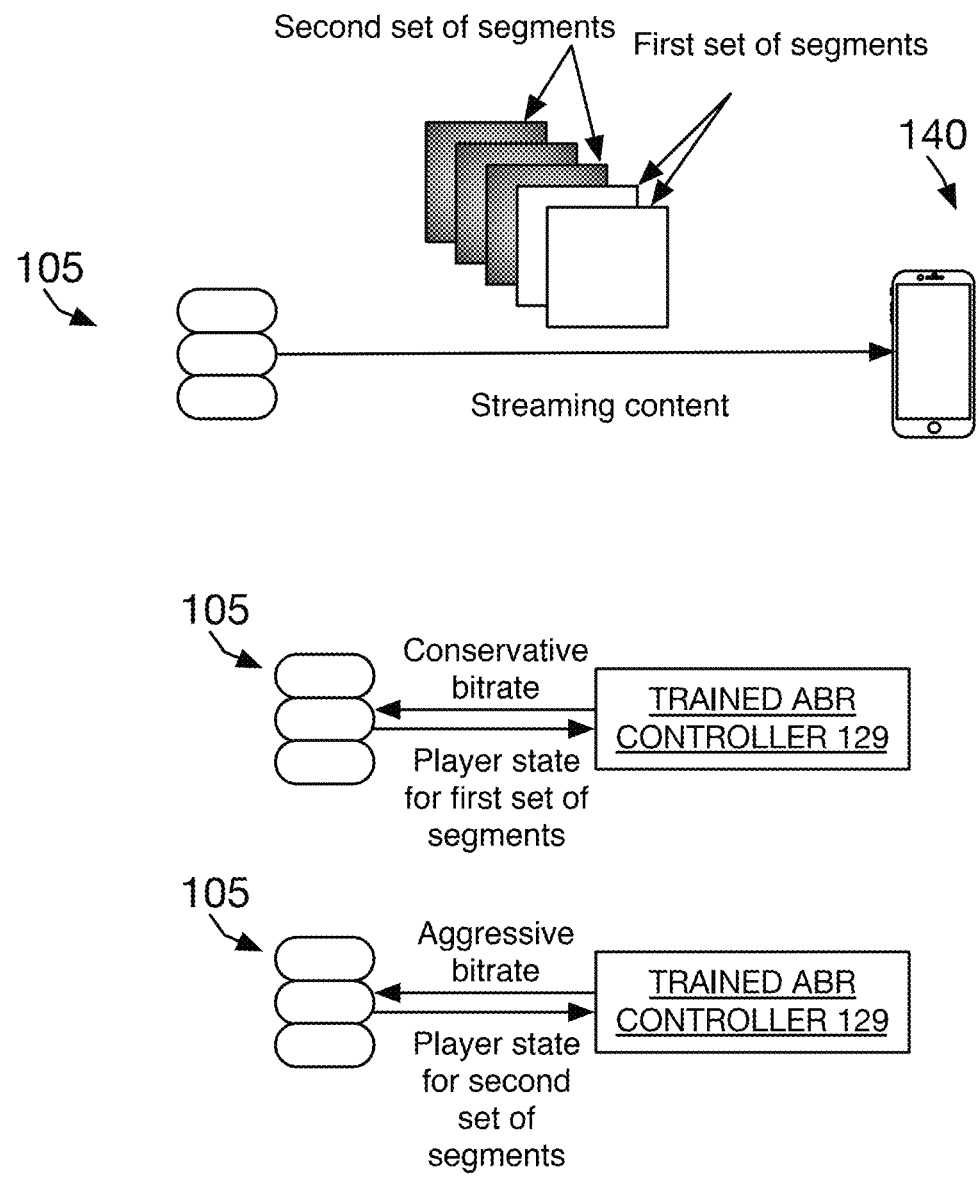
FIG. 8 is a schematic representation of an example of determining a streaming bitrate, wherein the streaming bitrate can be different for different sets of segments of the streaming content.

The output bitrate can vary based on content type, vary based on network conditions, be constant throughout a content stream, depend on the segment of the content, and/or can otherwise vary. In a specific example, as shown in FIG. 8, for a first set of segments of streaming content (e.g., first 1 minute, 2 minutes, 5 minutes, 10 minutes, etc.; 1 minute, 2 minutes, 5 minutes, 10 minutes, etc. since rebuffering, etc.), a conservative bitrate can be chosen. The conservative bitrate can be chosen to minimize the risk of a rebuffering event before a target time (e.g., playback time; time since last rebuffering such as a time that maximizes a duration of time before a subsequent rebuffer; time since content streaming started such as a time that maximizes a duration before a first rebuffering after starting a content stream; buffering duration such as a time that minimizes a rebuffering duration; an amount of time before the content needs to rebuffer such as 5 s, 10 s, 30 s, 1 min, 2 min, 5 min, 10 min, 30 min, etc.). In this specific example, during a second set of segments of the content (e.g., last rebuffering event occurred at least 1 min, 2 min, 5 min, 10 min, etc. ago), an aggressive bitrate can be chosen. The aggressive bitrate can be chosen to optimize for content quality. In a second example, a predetermined bitrate can be used for the first content segment, and the ABR controller-output bitrate can be used for subsequent content segments. However, the bitrate for different segments can be otherwise suitably chosen.

Content can include video, audio (e.g., music, podcast, sound, e-books, telephonic, etc.), multimedia, games, text (e.g., closed-captioning, real time text, etc.), images, and/or any suitable content. The content is preferably associated with player data (e.g., network data, user data, content data, etc.); however, the content can be associated with any suitable data.

Network data can include network information, network meta-data, and/or any suitable data. Network meta-data can include: network bandwidth (e.g., max; min; average such as average bandwidth for past 5 s, 10 s, 20 s, 30 s, 45 s, 1 min, 2 min, 5 min, 10 min, 15 min, 30 min, 1 hour, 1 day, 1 week, etc.; etc.), estimated bandwidth, dropped frames per second ratio, packet loss (e.g., percentage, rate, etc.), jitter, latency, data transfer (e.g., max data transfer; data transferred over a specific time range such as all time, this instance of connection, the preceding 1 min, 2 min, 5 min, etc.; etc.), throughput observations, and/or any suitable data. The network meta-data can include a network type (e.g., WiFi, mobile, broadband, cellular, etc.). The network metadata used for analysis (e.g., training and/or runtime bitrate determination) can be: real-time network metadata, network metadata for the last 10s of milliseconds or seconds, and/or network metadata for any other suitable time period. The network metadata is preferably normalized (e.g., to a notionally common scale, such as based on a common network parameter), but can alternatively be raw or otherwise adjusted.

Network information can include: first statistical moment information (e.g., mean) of network meta-data, second statistical moment information (e.g., variance) of network meta-data, higher moments (e.g., skewness, kurtosis, etc.) of network meta-data, other network statistics, network scenario cluster (e.g., network scenario cluster identifier, probability per network scenario cluster), and/or any suitable network information. The network information is preferably an estimate of the future network meta-data (e.g., estimated according to an equation, extrapolation, machine learning, etc. based on prior network meta-data); however, current and/or prior network meta-data can be used. The network information is preferably estimated for the next content segment (and/or the estimated time of next content segment streaming), but can additionally or alternatively be estimated for any other suitable timeframe. The network information can be continuous (e.g., a continuum of values) and/or discrete (e.g., discrete classes, clusters, network scenario clusters, etc.).

Content data (e.g., content meta-data) can include frame rate, scan system (e.g., interlaced, progressive, etc.), aspect ratio, color model, color depth, bitrate ladder, quality, compression method, stereoscopicity, segment index (e.g., segment ordering), segment size (e.g., where the content is broken into discrete time segments), buffer size (e.g., maximum buffer playback size), content type (e.g., real-time, on-demand, etc.), and/or any suitable content data.

User data can include: user preferences (e.g., quality vs down time, maximum acceptable rebuffer time, maximum acceptable rebuffer rate, etc.), user behavior (e.g., how long does a user wait be shutting off content, how long does a user typically spend consuming content, types of content the user consumes, time-of-day habits, etc.), user location (e.g., at home, at work, at a sporting event, commuting, driving, etc.), and/or any suitable user data. The user data can be manually entered and/or automatically determined (e.g., learned).

The system herein can be used with or include a content server 105 (e.g., an OTT server). The content server 105 can stream content segments to a client device at a content player application, at a requested (e.g., determined by an ABR controller) bit rate. The system may also use or include machine learning model(s) 160 and trained learning agent(s) 170 (e.g., neural networks). This will be described in further detail below.

In some embodiments, the system is used with or includes one or more training data repositories 110. In a preferred embodiment, these repositories include recent streaming experience data 112, which can include, for example, recent content bitrates (i.e., how good was the quality of the content), recent rebuffering ratio, and time since session start (i.e., how long into the session the user device is right now). Behavior might be different at the session start compared to midway through. However, the repositories can include: historic streaming experience data, simulated streaming data, and/or any other suitable content data. The training data preferably has high variance (e.g., is associated with highly disparate network conditions, content parameters, etc.; has condition values that vary beyond a predetermined variance; etc.), but can additionally or alternatively share common: network conditions, network statistics, network meta-data, content meta-data, and/or any other suitable set of parameters.

In a preferred embodiment, the system uses training data repositories 110 to store streaming user data 114, which can be retrieved by one of more components of the system. For example, the streaming user data can include who the subscriber is (wherein the model needs to be different for different subscribers), what context the subscriber watches in, and time of day (e.g., the way a user engages with content may be different when the user is in a hurry to leave for the office, compared to when the user is relaxed in the evening). However, any other suitable user data can be stored.

The training data repositories 110 can also include large scale OTT content streaming data and/or services 116. In some embodiments, these streaming data and/or services can be received as a batch. And in others, they can be received in real time (e.g., during learning agent training and/or during deployment). In some embodiments, the streaming services can be high variance data. One example use is for simulating diverse content properties and non-stationary network scenarios during training. To enable the ABR controller to experience and learn an output strategy (e.g., an optimal strategy, a near-optimal output strategy, etc.) for a wide variety of practical scenarios, input data can be retrieved from a large scale OTT content streaming service, to simulate diverse content properties (e.g., multiple bitrate ladders, segment sizes, maximum playback buffer sizes, etc.), as well as network scenarios that are not stationary over periods of minutes (e.g., a mobile user hand-off across multiple cells, a home user moving from one room into another with poor coverage, a mobile user switching from WiFi to cellular, etc.).

The system can also include data repositories 150, which contain data that can be retrieved by components of the system. The data repositories 110 can include content segments 152. These include segments of chunked content for streaming. The segments are downloaded per time step in short amounts (e.g., four to eight seconds) of content for content streaming. Other data within the data repositories 150 can include network conditions 154, content properties 156, or any other suitable data.

The system can include a platform 120. The platform can be implemented on a remote cloud-based server system, distributed computing systems, local computing systems, or any other systems. The platform can operate in series and/or parallel for one or more pieces of content. The platform functions to train one or more ABR controllers, and can optionally execute the ABR controller or select the bitrate during runtime. The platform can be shared with and run on a user device (e.g., OTT application on a user device), a remote computing system (e.g., server, cloud, etc.), a streaming content provider, and/or at any suitable location or combination thereof.

The platform can optionally include a simulator 122 (e.g., an enhanced simulator). In a preferred embodiment, the simulator 122 is a trace-driven simulation; however, the simulator 122 can be a chunk-level simulator, packet-level emulator, real-time data, and/or any suitable data. The simulator can function to determine reward (or unstructured data used to generate the reward) used to train ABR controller during ABR controller training. In one example, the simulator can simulate the content streaming session, given the training set of session property values and network characteristic values and the ABR controller-determined bitrate, and determine a quality of experience score based on the simulation. The simulator can optionally generate simulated content (e.g., based on real content, simulations, etc.) for training the ABR controller, store content (e.g., previously streamed content, currently streaming content, content meta-data, network data, user data, etc.), determine player state (e.g., network meta-data, content meta-data, etc.), determine player properties (e.g., player settings), determine user information, and/or perform any suitable function. The simulator is preferably configured to stream the content in the same manner as the user device (e.g., using an OTT application); however, the simulator can be otherwise suitably configured.

Player properties (e.g., player settings) are preferably settings associated with a content player. Player properties can be manually selected, programmatically selected, automatically selected, and/or selected in any suitable manner. The player properties are preferably fixed and/or slowly changing; however, the player properties can be changed on any suitable time scale. The player properties can be associated with a user (e.g., a specific user device, a specific user, etc.), with the OTT application, a streaming content provider, and/or associated with any suitable entity.

The reward preferably includes quality of experience (QoE) score, however, reward can include content streaming quality, content streaming rebuffer time, content streaming lag, content streaming smoothness, quality of service (QoS) scores, frame loss (e.g., length, rate, number, etc.), user behavior metrics, a performance score (e.g., wherein the training data includes historical streaming sessions, wherein the ABR-controller-selected bitrate's streaming performance can be compared to the historical, actual bitrate's streaming performance, a KPI, etc.), and/or any suitable reward or combination thereof. The reward is preferably normalized (e.g., based on the content data, based on the network scenario, based on the user data, etc.); however, the reward can be processed in any suitable manner. In examples, the reward is normalized based on the network information values and/or network metadata values to a notionally common scale (e.g., 0 to 1). However, the reward can be otherwise normalized.

The simulator is preferably driven by offline real-world data which can be collected from training repositories, content player applications, content servers, and any other suitable sources of data; however, the simulator can be driven by real-time data. In a preferred embodiment, the data is collected in real time and stored offline. Offline data is then fed as an input into the simulator. Simulator inputs can include: content, network data, content data, bitrate (e.g., determined bitrate from ABR controller), and/or any suitable inputs. Simulator outputs can include: reward (e.g., reward function), normalized reward, network data, content data, user data, simulated network data, simulated content data, simulated user data, and/or any suitable output.

To train an ABR controller (e.g., learning agent), simulations (e.g., simulated content) over a large corpus of data are used. The data can include network data, content player data (e.g., the OTT client application), content data, user data, and/or any suitable data. In a preferred embodiment, the simulator employs a content segment levels simulator, or chunk level simulator, which allows fast simulations of scenarios. Alternatively, packet level simulations, emulations, or data collected from live content clients can be used. Simulated content preferably represents diverse content data (e.g., metadata, information, etc.), but can additionally or alternatively represent diverse network data (e.g., metadata; information; non-stationary network information such as mobile user hand-off between cell towers, moving between locations with different WiFi coverage, transitioning from WiFi to cellular, transitioning from cellular to WiFi, transition from local area network to wide area network, etc.), and/or diverse user information; however, simulated content can represent uniform content meta-data (e.g., same content streaming), stationary network information, uniform user information, and/or any suitable data. The data can be simulated based on real-world data (e.g., real-world content streaming sessions), but can additionally or alternatively be based on a predetermined set of content streaming session properties and/or network characteristic values (e.g., wherein the simulator can randomly, probabilistically, and/or otherwise select a set of content and/or network parameter values to use), or be otherwise simulated.

In a specific embodiment, when an ABR controller (e.g., learning agent) is first initialized and untrained, the weights are initialized at random. A random ABR is selected, and the simulator simulates what happens if the neural network selects the ABR for a user and the network with particular conditions. Weights are then updated and/or otherwise tuned based on a reward function. The simulator can run through many (e.g., ten thousand or a million) simulations to train the neural net, until a bitrate adaptation policy converges to a more optimal solution.

In some embodiments, the simulator 122 can include a network simulator, which simulates the underlying network. Inputs to the network simulator can include a selected ABR for downloading content segment, an offline real-world data on network conditions. Outputs can include network data, network conditions for the simulator to model within the simulation, and/or any suitable output.

In some embodiments, the simulator can include a player simulator. The player simulator can simulate the content player application (e.g., client). Inputs for the player simulator can include a selected ABR for downloading the content segment, a previous ABR for content segment download, network throughput traces, content properties, playback buffer data, content data, and/or any suitable data. Outputs can include server state observations (e.g., current playback buffer, occupancy, rebuffering time, content segment download time, size of next content segment at all available bitrates, number of remaining content segments in the content, etc.), content data, and/or any suitable outputs. The player simulator can be: deterministic, probabilistic, and/or otherwise configured. The player simulator can be: trained, manually determined, or otherwise determined.

In some embodiments, the simulator 122 can include a user simulator. The user simulator can be a model-driven simulation which simulates user data during streaming of content. The user simulator can be trained on a model of user behavior. In some embodiments, the model is of an individual user's behavior. While in other embodiments, the model is of multiple aggregated user's behavior in a group of users. In some embodiments, the users can be grouped by (e.g., quality sensitivity, how likely the user is to stop streaming right away if quality is not high, etc.), by device, by network type (e.g., cellular versus wi-fi), by content type (e.g., live streaming versus on demand movie, etc.); however, the users can be grouped in any manner. Inputs can include user behavior within the ML model and a selected ABR for content segment download. Outputs can include user behavior for the simulator to model for the simulation, a user behavior classification, and/or any other suitable output.

In some embodiments, a network characterizer 124 (e.g., network predictor, network scenario clusterer, network scenario congregator, etc.) is included. The network characterizer preferably functions to predict network information (e.g., network statistics) based on long-term (e.g., >1 minute, >5 minutes, >10 minutes, >30 minutes, etc.) network conditions data. However, the network characterizer can predict network information based on short-term network conditions data and/or any suitable data. In a first variant, the network characterizer 124 can be trained to predict the first order (i.e., mean) and second order (i.e., variance) throughput statistics using measurements of current and/or historical network conditions data. In a second variant, the network characterizer 124 can be trained to classify the network into one or more network scenario clusters (e.g., optimal network scenario clusters such as optimal number of network scenario clusters, optimal network scenario cluster identifiers, etc.). In a specific example of the second variant, the network characterizer can determine a network scenario cluster based on mobility (e.g., high mobility such as driving; medium mobility such as walking; low mobility such as stationary, at home, etc.; etc.), signal strength (e.g., high signal strength such as near a router, near a cell tower, etc.; low signal strength such as far from a router, far from a cell tower, on cell edge, etc.; etc.), connectivity (e.g., good, bad, etc.), and/or the network scenario cluster can be based on any suitable network characteristic(s). However, the network characterizer can be configured in any suitable manner. The network information can be used as an input to the ABR controller. In some embodiments, the download time of a content segment provides the timescale for throughput measurements. Since the network throughput over a longer timescale is more stable than over a shorter time scale, this sequence of intervals can be used to estimate the variance of the network. The network characterizer assists the ABR controller in adapting to diverse network scenarios. Inputs to the network characterizer can include: the current network conditions data, historical network conditions data, and/or any suitable inputs. The inputs can be received from the simulator (e.g., during ABR controller training), the computing device (e.g., from the client, from the user device, etc. during runtime), remote server (e.g., during runtime), and/or from any suitable component with any suitable timing. The output of the network characterizer can include: network information, network meta-data, the predicted network conditions for the next content segment download, network cluster identifier, and/or any suitable outputs. The outputs are preferably sent to the ABR controller; however, the outputs can be sent to the simulator, data training repository, a remote server, and/or to any suitable component.

The network characterizer can be a neural network, deterministic model, probabilistic model, set of rules, set of heuristics, an equation, and/or any other suitable model. The network characterizer is preferably different from the ABR controller; however, the network characterizer can be a set of precursor layer(s) or node(s) before the ABR controller layers, additional node(s) within the ABR controller layers, and/or be otherwise related to the ABR controller. In specific embodiments, the network characterizer is preferably trained to determine the network information from the network data. The training can be supervised, unsupervised, and/or reinforced (e.g., using the same reward as used to train the ABR controller, using a different reward, etc.). However, the network characterizer can be otherwise suitably configured.

In some embodiments, the system can include a content congregator 126. The content congregator can function to cluster content with similar sets of content properties (e.g., bitrate ladder, segment size, maximum play rate buffer, etc.) into clusters (e.g., optimal clusters) based on similarity of properties or set thereof; however, the content congregator can cluster content based on user data, network data, play state, player properties, and/or any suitable data. The content properties of the clusters (e.g., bitrate ladder, segment size, maximum play rate buffer, feature vectors, etc.) can be used as inputs to the ABR controller; however, a cluster identifier and/or any suitable data can be used. The content congregator assists the ABR controller in adapting to diverse content properties. The content congregator inputs are preferably the content data, player state, player properties (e.g., player settings), and/or any suitable inputs. During training, the content congregator inputs are preferably received from the simulator. During runtime, the content congregator inputs can be received from the user device, a computing device, a content streaming service, a remote server, and/or from any suitable component. However, the content congregator inputs can be otherwise determined. The content congregator outputs can include: clustered sets of contents with similarity of properties, content cluster identifier(s), content cluster properties, content data, feature vectors, and/or any suitable output. The content congregator outputs are preferably sent to the ABR controller; however, the content congregator outputs can be sent to the simulator, the training data repository, remote server, and/or to any suitable component. However, any other suitable method of aggregating similar contents can be used.

The content congregator can generate any suitable number of content clusters and/or range thereof. Examples of content cluster numbers that can be generated include: between 1-100 clusters, such as 50 clusters, however, any suitable number of content clusters can be identified. Each content cluster is preferably associated with a corresponding content cluster identifier; however, the content clusters can be otherwise suitably identified.

The content congregator can be a neural network, deterministic model, probabilistic model, set of rules, set of heuristics, an equation, and/or any other suitable model. The content congregator is preferably different from the ABR controller; however, the content congregator can be a set of precursor layer(s) or node(s) before the ABR controller layers, additional node(s) within the ABR controller layers, and/or be otherwise related to the ABR controller. In specific embodiments, the content congregator is preferably trained to determine the content cluster(s) from the content data. The training can be supervised, unsupervised, reinforced (e.g., using the same reward as used to train the ABR controller, using a different reward, etc.), or otherwise performed. The content congregator can include one or more classifiers, wherein each classifier can classify a given piece of content into one or more clusters (e.g., associate a piece of content with one or more cluster identifiers). In a first variant, the content congregator includes a single classifier, wherein the single classifier can cluster content into multiple content clusters. In a second variant, the content congregator can have a different classifier for each content cluster. However, the content congregator can be otherwise suitably configured.

In some embodiments, the system can include one or more ABR controllers 128. The ABR controller functions to select ABRs for content segment downloads during a content stream on a user device. The ABR controller can function to determine an ABR algorithm to determine an output bitrate for content streaming. In embodiments with more than one ABR controller, each ABR controller can be associated with a specific content cluster identifier, specific network information, and/or can be identified in any suitable manner. Inputs to the ABR controller include network information, content data, content cluster identifier, a player state, a player property (e.g., player settings), user data, network data, a reward, a normalized reward, and/or any suitable data. The inputs to the ABR controller can be normalized (e.g., at the ABR controller, as received by the ABR controller, etc.) and/or not normalized. Outputs can include an ABR selection (e.g., a bitrate, content bitrate, streaming bitrate, training bitrate, etc.), which is sent to a content player application and/or content server, an ABR algorithm, and/or any suitable data. In a specific example, for content with a bitrate ladder, the bitrate ladder can be normalized so that the lowest bit rate corresponds to 0 and the highest bitrate corresponds to 1, with intermediate bitrates uniformly distributed between 0 and 1. This normalization can be agnostic to the specific bitrate ladder. The output bitrate can be a normalized output bitrate within the normalized bitrate ladder. The streaming bitrate can be determined from the normalized output bitrate based on the normalized bitrate ladder. However, the output bitrate can be determined in any suitable manner. In some embodiments, the ABR selection is also sent back to the simulator to further generate simulations based on additional real-world data.

In specific variants, the ABR controller can predict short-term (e.g., 0.5 s, 1 s, 2 s, 4 s, 8 s, 10 s, 30 s, etc.) network information and receive long-term network information from a network characterizer. In these specific variants, the ABR controller can determine a bitrate based on the predicted short-term network information and the long-term network information. However, the ABR controller can be configured to predict long-term and short-term network information and/or the ABR controller can be configured in any suitable manner.

In a specific example, before training, an ABR controller can provide a random bitrate (e.g., from the available bitrates). In a second specific example, before training, the ABR controller can provide a bitrate calculated from a model predictive control (MPC) algorithm. In a third specific example, a trained neural network (e.g., ABR controller) can be used to (dynamically) determine a streaming bitrate (e.g., for each one or more successive content segments). In a fourth specific example, the trained neural network can determine an ABR algorithm. The ABR algorithm can be used to determine the bitrate. However, the bitrate can be determined in any suitable manner.

In a specific example, for a first content segment the ABR controller (e.g., trained ABR controller) can select a bitrate of 1 Mb/s based on the network information, the content cluster identifier, and/or based on any suitable information. In this specific example, a network characterizer can classify the content to a "high mobility" network scenario cluster (e.g., riding in a car, driving, etc.). Based on the high mobility scenario, the ABR controller can select a bitrate of 0.6 Mb/s for a second (e.g., subsequent) content segment.

In a second specific example, for a first content segment the ABR controller (e.g., trained ABR controller) can select a bitrate of 1 Mb/s based on the network information, the content cluster identifier, and/or based on any suitable information. In this specific example, a network characterizer can classify the content to a "stationary" network scenario cluster (e.g., watching television, at home, etc.). Based on the "stationary" mobility scenario, the ABR controller can select a bitrate of 1 Mb/s for a second (e.g., subsequent) content segment. However, the ABR controller can determine the bitrate in any suitable manner.

The ABR controller preferably includes a neural network (e.g., deep neural network); however, the ABR controller can include Bayesian algorithm, Markov algorithm, kernel methods, and/or any suitable algorithm and/or model. The ABR controller can be predetermined, learned (e.g., trained using deep reinforcement learning, reinforcement learning, supervised learning, unsupervised learning, etc.), designed using model predictive control, or otherwise determined. The ABR controller can be determined (e.g., trained) by a remote computing system, at a content streaming service, the same or different system executing the ABR controller during runtime, and/or determined by any other suitable training system. When the ABR controller is trained, the training system can simulate or receive training data from: the content streaming service, the user devices, and/or any other suitable source.

The system can include state space, action space, and feedback. The state space preferably includes all information relevant for making bitrate decisions. For example, the state space can include network statistics, content properties, current bitrate, file size of the next content segment, etc. The state space is preferably generated during the generation of the ML model, and regularly updated to reflect the most current information necessary for making bitrate decisions. However, the state space can be: simulated by the simulator, extracted (e.g., calculated) from the data (e.g., training data, runtime data), etc.), or otherwise determined. The action space can be the action of determining a bitrate for the next content segment. Feedback can be the reward (e.g., reward signal, reward function, etc.) that can be derived directly from networks statistics, content properties, used behavior, or any other suitable data. Examples of the feedback can include: quality of experience (QoE), quality of service (QoS), and/or any other suitable metric.

In one example, the system calculates a positive reward when the resulting content quality is higher. The system can calculate a penalty when the content rebuffers, and/or the bitrate gets changed. Inputs can include network statistics, congregated content properties, normalized representations of the content player state, user behavior predictions, and any other suitable inputs). In another example, the system calculates the QoE (quality of experience score) (e.g., using standard QoE calculations for A/V streaming, voice or video over IP streaming (VOIP), etc.; using custom QoE calculations; etc.) based on the simulated playback at the ABR-controller-selected bitrate during training. The learning agent maps the state inputs to the probability distribution of the next bitrate, which is an encoding of the bitrate adaptation policy.

The system preferably includes a user device and/or client device 140. The client device can be a desktop computer, a laptop, computer, smartphone, tablet, or any other device operated by a client. The client device preferably includes a front-end module 142, which can include a content player application (e.g., an OTT player application for providing content streaming to a user, OTT application, etc.). In some embodiments, the user device 140 can also include customer wallet(s) 144 to be linked to a user within an exchange. In some embodiments, the user device 140 can include a browser application 146 which can be used alternatively and/or additional to the front-end module 142 and/or content player application. In specific examples, the system can include one or more user devices (e.g., p2p file transfer, gaming, etc.).

4. Method.

The method functions to use machine learning models to provide dynamic ABR selections for content streaming in a way that optimizes for both user experience and user engagement for diverse network scenarios and content properties.

In some embodiments, the method can be performed, in part or in whole, by the platform 105, by the user device 140, at a client (e.g., OTT provider) application (e.g., video player, audio player, multimedia player, etc.), at a remote computing system (e.g., remotely controlling the content player), at a content streaming service (e.g., video streaming service, audio streaming service, etc.), and/or at any other suitable system.

Training the ABR controller S100 preferably functions to generate generalized ABR controller(s) that result in high QoE scores (e.g., above a predetermined threshold, above a predetermined normalized threshold, etc.) across a wide variety of network scenarios (e.g., network meta-data and network information values), content properties (e.g., content meta-data values), user data, and/or other suitable data. At S100, the system can operate to train a learning agent (e.g., an ABR controller, a neural network, etc.). S100 functions to train a learning agent using real-world data, such that the learning agent is capable of determining an optimized ABR (e.g., training bitrate, streaming bitrate, content bitrate, etc.) given input conditions, properties, and/or behaviors.

S100 preferably occurs at an ABR controller in communication with a simulator, network characterizer, and content congregator; however, any suitable component can be used. S100 preferably occurs before determining a streaming bitrate S200; however, S100 and S200 can occur at the same time, S200 can occur before S100 (e.g., when streaming content is used to train the ABR controller).

The ABR controller is preferably trained with individual pieces of content; however, a set of training content can be used to train the ABR controller (e.g., population data for a given piece of content, content segment, network conditions, etc.), and/or any suitable content can be used to train the ABR controller. The content can be: new content, streaming content, stored content, training content, historical content, simulated content, and/or any other suitable content. The ABR controller is preferably trained using reinforcement learning (e.g., deep reinforcement learning); however, supervised learning and/or unsupervised learning can be used.

In a preferred embodiment, the system utilizes reinforcement learning (RL) techniques to train the learning agent. The RL algorithm can be a deep RL approach, an inverse RL approach, an apprenticeship learning approach, and/or any other suitable RL approach. Additionally or alternatively, the method can use any other suitable training and/or learning algorithms to train the learning agent. The RL model inputs are training set data (e.g., training content) which can include a set of content properties (e.g., content data) collected from offline real world data, a set of network conditions (e.g., network scenarios, network data, etc.) collected from offline real-world data, a set of simulated content (e.g., with simulated network data, simulated content data, etc.), and/or any suitable training content. The input determination frequency is per simulated content segment download, which can be a non-uniform amount of time (e.g., four to eight seconds per content segment download) depending on the time taken to download a content segment.

The RL model's Q-value (Q) can include a state parameter and an action parameter, and function to map this state-action pair to a reward (e.g., a reward function). The state comprises network data, content data, user data, and/or other suitable data. The action can be, for example, selecting an ABR for a given content segment download on the network for a given user or group of users. The RL model output can be the bitrate, which results in the learning model being weighted. The simulator running to train the learning agent can include the network simulator, player simulator, and user stimulator, for example, as described above.

In some embodiments, if the learning agent has no training, the simulator can select a random ABR. Alternatively, the simulator can select an ABR based on learning agent weights. The simulator simulates what happens when an ABR is selected and provides a reward function to the learning agent (i.e., standard reinforcement learning terminal logic). The reward function is used to train the learning agent based on the user behavior model and/or other models. The reward function can provide some measurements back to the neural network. The neural network can observe the measurements for the reward it received from the previous action, and can attempt to perform another action (e.g., select another bitrate) for the same or different set of inputs (e.g., different piece of content). The cycle can be repeated arbitrarily (e.g., thousands, millions, etc. of times for a single piece of content, for distinct pieces of content, for a set of content, etc.), and a trained neural network is ready for deployment. In some embodiments, a reward normalization technique is used. This technique normalizes the differences due to different properties (e.g., content properties, network scenarios, and/or user behaviors).

S100 can include generating a machine learning (ML) model for streaming media S150. Generating an ML model can function to build a model that is capable of modeling network conditions, content properties, and/or user behavior for optimizing content streaming.

In a first variant, the ML model can include a network congregator, content congregator, simulator with network simulator, player simulator components, and an ABR controller, as described above.

In a second variant, the ML model can include all of the first variant, and additionally the simulator can include a user simulator component trained on a user behavior model. In a preferred embodiment, this is a per-step model (e.g., a model which only needs to predict whether the user will continue watching during the next time step, such as the duration of one content segment, four to eight seconds, etc.). Time steps can be uniform or non-uniform. Time steps can depend upon the length of the content segment, total length of the content, and/or have any suitable duration.

Inputs of the user behavior model are preferably in real time and are capable of changing over a given time period. One input of the user behavior model can include recent streaming experience data, which is sent in real time to a learning agent being trained from a player simulator and/or from a training data repository, which includes recent streaming experience data. Another input of the user behavior model can be streaming context data, which is sent in real time to a learning agent being trained from a player simulator or from a training data repository, which includes streaming context data. In some embodiments, the streaming context data is available offline. Other inputs can include: user commands (e.g., pauses, seeing, stopping, refreshing), behavioral characteristics of the video, and/or any other suitable set of inputs. One output of the user behavior model can be a likelihood (e.g., in a numerical ranking, percentage, and/or any other suitable measurement of probability) that the user will continue watching the next segment at the next step given current conditions.

S100 can include determining network information, which can function to determine network information and/or network meta-data from the network data. Determining network information is preferably performed by a network characterizer; however, additionally or alternatively, determining network information can be performed by a simulator, an ABR controller, and/or by any suitable component.

Determining network information can occur before, at the same time as, and/or after determining content cluster(s). Determining network information is preferably before determining a training bitrate; however, determining network information can be at the same time as determining the training bitrate.

In a first specific embodiment, determining network information can include retrieving the network information and/or the network meta-data from memory (e.g., data storage repository). In a second specific embodiment, the network information can be calculated (e.g., from historical network data, based on current network data, etc.). In a first specific example of this embodiment, the first statistical moment (e.g., mean) and second statistical moment (e.g., variance) of the network meta-data can be calculated for any suitable time range (e.g., previous 10 s, 20 s, 30 s, 40 s, 50 s, 1 min, 2 min, 5 min, 10 min, 15 min, etc.) for the training content. In a second specific example of the second embodiment, the network characterizer can be trained to determine the future network meta-data (e.g., network information) based on current and/or historical network meta-data. In this specific example, the difference between the predicted network information and measured network meta-data (e.g., measured after the time period has elapsed) can be used as the reward for training the network characterizer; however, any suitable reward can be used. However, the network information can be otherwise suitably determined.

S100 can include determining a content cluster, which functions to cluster a given piece of content into content clusters based on the content meta-data. Determining a content cluster can optionally function to cluster content into content clusters based on user data, network data, and/or any suitable data. In a specific example, the content cluster can be determined based on the content bitrate ladder, content segment size, and content playback buffer; however, the content can be clustered in any suitable manner. Determining a content cluster is preferably performed by a content congregator; however, additionally or alternatively, determining a content cluster can be performed by an ABR controller, a simulator, and/or by any suitable component. Determining a content cluster preferably occurs before determining a training bitrate; however, determining a content cluster can occur at the same time as determining a training bitrate.

Determining a content cluster preferably outputs a content cluster identifier; however, additionally or alternatively, determining a content cluster can output content cluster parameters (e.g., content meta-data, bitrate ladder, segment size, content playback buffer, etc.), selectively route player state information (e.g., content meta-data, network meta-data, user data, etc.) to a specific ABR controller (e.g., an ABR controller associated with a given cluster), and/or perform any suitable action(s).

In a first specific embodiment, the content cluster identifier associated with a piece of content can be retrieved from memory. In a second specific embodiment, the content congregator can be trained to determine clusters (e.g., near-optimal content clusters) to group content into clusters. The content congregator can output a content cluster identifier based on the content cluster that a piece of content is included in. In this specific embodiment, the content congregator can be trained based on the QoE score, total number of ABR algorithms for the set of content, and/or any suitable metric can be used to train the content congregator. However, the content cluster and/or content cluster identifier can be otherwise suitably determined.

S100 can include determining a training bitrate preferably functions to determine a bitrate for streaming (e.g., simulating streaming) training content. The training bitrate is preferably selected from the bitrate ladder associated with the content; however, any suitable bitrate can be used. The training bitrate is preferably selected for a successive content segment, but can additionally or alternatively be selected for the current content segment, a subsequent content segment (e.g., next content segment, future content segments separated from the current content segment by one or more segments, etc.), another piece of content, and/or for any other suitable piece of content or subset thereof. The training bitrate can be determined by the ABR controller (e.g., that is being trained), from an ABR algorithm, neural network, and/or otherwise be determined. The training bitrate is preferably transmitted to a simulator; however, the training bitrate can be transmitted to a training data repository, and/or to any suitable component.

S100 can include determining a reward. Determining a reward preferably functions to determine a reward (e.g., reward function, reward value, etc.), normalize the reward (e.g., to a notionally common scale), and/or perform any suitable function. Determining a reward is preferably performed by a simulator (e.g., reward based on a score for simulated content streaming); however, the reward can be determined by any suitable component. The reward is preferably a QoE score (e.g., for A/V streaming; for VOIP streaming, etc.), but can alternatively be a user action score or any other suitable reward. In one example, a positive reward can be determined when the resulting content quality is higher. In a second example, a negative reward (e.g., a penalty can be calculated when the content rebuffers and/or the bitrate changes. However, the reward can be determined in any suitable manner.

Determining a reward preferably include normalizing the reward. Normalizing the reward preferably functions to generalize the reward (e.g., to multiple network and/or content contexts), and can enable the ABR controller to be trained for a variety of content. The reward can be normalized based on the network meta-data, network information, content meta-data, user data, and/or any suitable data.

Determining content streaming bitrate, S200, preferably functions to select a bitrate (e.g., streaming bitrate) for streaming content during runtime. The streaming bitrate preferably depends on the segment of the content; however, the content streaming bitrate can be the same for the duration of content streaming, for a series of segments, and/or be used in any suitable manner. The streaming bitrate is preferably used for streaming the content; however, the bitrate can be a suggestion (e.g., can be ignored in favor of user settings), and/or be used in any suitable manner. S200 is preferably performed by a trained ABR controller; however, an untrained ABR controller, and/or any suitable component can be used. S200 is preferably performed during ABR controller training, and can additionally or alternatively be performed (e.g., automatically, in response to receipt of a request from a video player, etc.) during runtime. The streaming bitrates are preferably determined for each segment separately; however, the streaming bitrates can be determined for all segments of the content (e.g., at the same time, all segments have the same streaming bitrate, etc.), a subset of segments, and/or can be determined in any suitable manner. Streaming bitrates for one or more future segments of content are preferably determined; however, streaming bitrates can be determined only for the current segment (e.g., immediately at the start of the segment), and/or with any suitable timing.

In some embodiments, an ABR is determined for a next content segment to be downloaded. In some embodiments, the ABR is modified based on a redeployment of the trained learning agent for an additional content segment.

Figure 5:
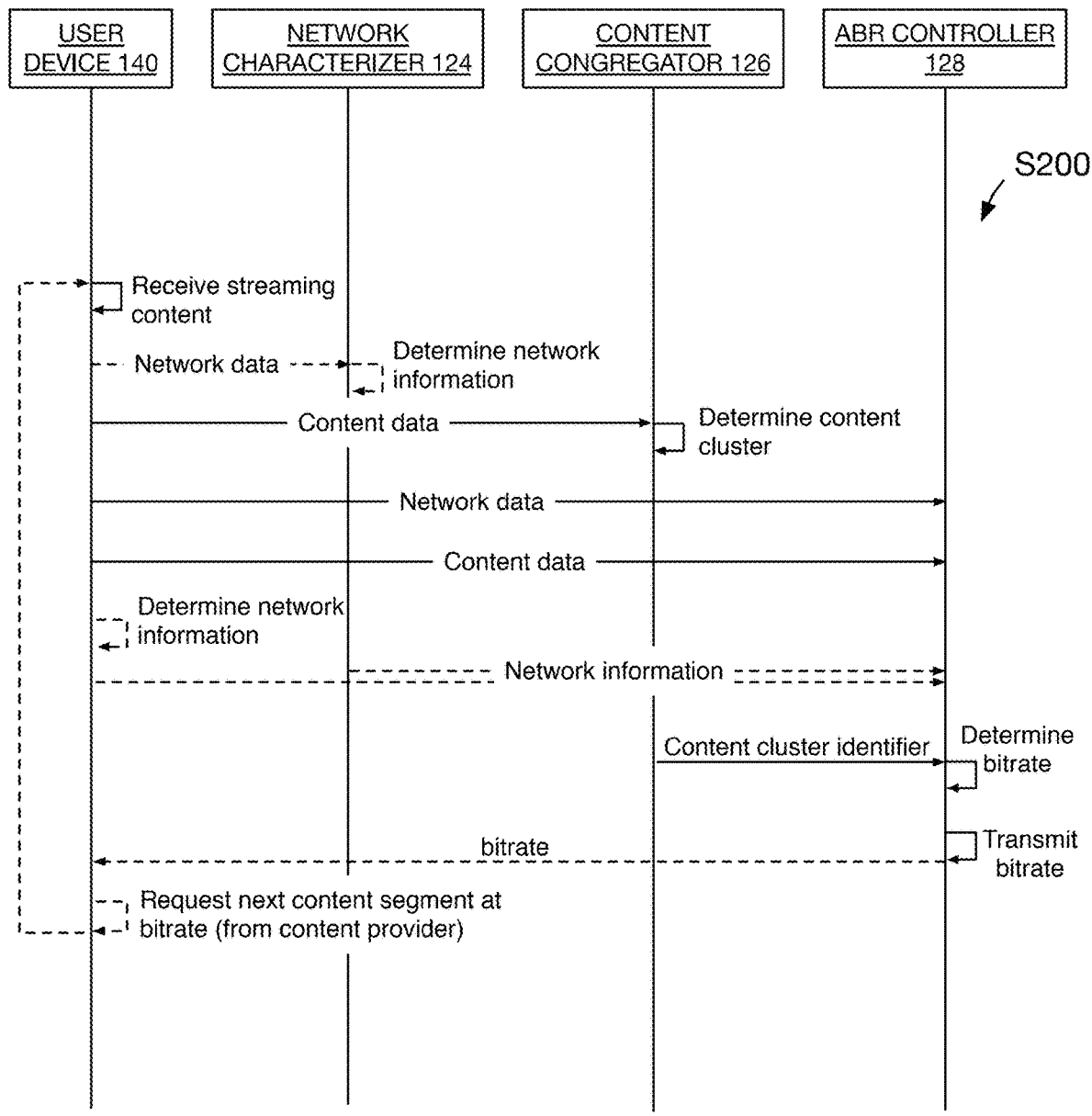
FIG. 5 is a schematic representation of an example workflow of determining a streaming bitrate.

As shown for example in FIG. 5, S200 can include: determining network data based on real-time network measurements for the streaming session; determining network data and/or network information (e.g., predicted throughput statistics for the session) based on historical network measurements with the network characterizer; determining player state (e.g., content meta-data, user data, network meta-data, etc.) based on real-time content measurements for the streamed content; and determining a streaming bitrate based on the network data, network information, and content metadata, wherein the next segment of the streamed content is streamed (e.g., at the client) at the determined streaming bitrate.

In some embodiments, S200 can optionally include receiving a request for ABR from a content player application on a client device, S250. S250 functions to receive a request for ABR as a triggering event for a trained learning agent to determine ABR. For example, the user navigates to a streaming real time media application, selects a content to watch, and the application sends a request for the ABR to the platform.

In some embodiments, at S200 the system deploys the trained learning agent to determine an ABR for the content player application. In the preferred embodiment, the trained learning agent is deployed in real time. In a preferred embodiment, each time the client finishes downloading a content segment, the learning agent runs the model and outputs a predictive decision (e.g., for the next segment). The client receives the bitrate for the next segment, then downloads the next segment at the selected bitrate. Then the learning agent once again runs the model and outputs a predictive decision. In some embodiments, the learning agent can be deployed for each time step arbitrarily until a termination event such as the content stream terminating. However, the streaming bitrate can be determined in any suitable manner.

In a specific example, for a first set of segments of the content (e.g., at the beginning of streaming content, within a rebuffering time of a previous content rebuffering, etc.) the bitrate can be a conservative bitrate. The conservative bitrate can be determined to prevent content rebuffering (e.g., before a target rebuffer time such as 10 s, 30 s, 1 min, 2 min, 5 min, 10 min, etc.). In this specific example, for a second set of segments of the content occurring after the first set of content segments (e.g., segments separated from the beginning of the content, the first content segment, a previous rebuffer event, etc. by at least 10 s, 30 s, 1 min, 2 min, 5 min, 10 min, 15 min, etc.), an aggressive bitrate can be determined. The aggressive bitrate can be chosen to maximize a content quality. The ABR controller can be trained to select between an aggressive or conservative bitrate (e.g., based on content meta-data); however, the ABR controller can be instructed to favor a conservative and/or aggressive bitrate, and/or the type of streaming bitrate can be otherwise suitably determined. However, the streaming bitrate can be determined in any suitable manner.

S200 can include: streaming content based on the bitrate, sending request to ABR controller to determine a bitrate, and/or any suitable steps.

Figure 3:
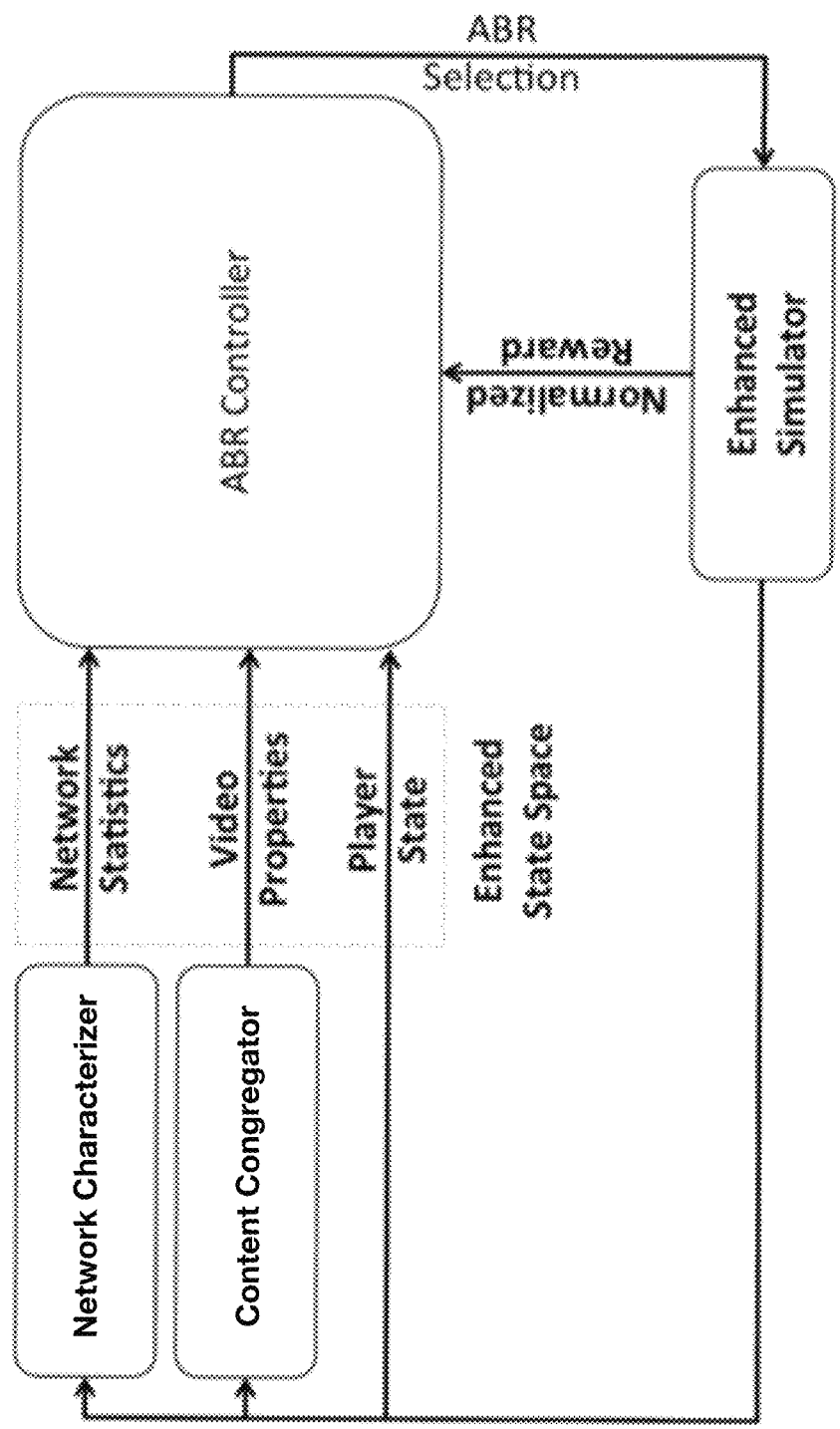
FIG. 3 is a block diagram schematic of an example of the system.

FIG. 3 is an illustration of an example of ABR selection according to one of the embodiments. In the example, a simulator, content congregator, and network characterizer send outputs to an ABR controller. The network characterizer outputs network statistics, the content congregator outputs content properties, and the simulator outputs a normalized reward to the ABR controller. Additionally, a player state is sent to the ABR controller (e.g., from a content player application on a user device). The components operate within a state space reflecting necessary data needed for the ABR controller to select an output ABR (e.g., near-optimal bitrate) given content properties, network conditions, and user behavior. The ABR controller then outputs an ABR selection based on these inputs. The ABR selection is received as an input to the simulator, which can generate an additional reward based on the outcome of the selected ABR.

In a first specific example, the method can include: receiving one or more content streaming segments (e.g., segment of a simulated or real-world content streaming session, which preferably has a wide range of properties with a wide range of characteristics, but alternatively with any suitable set of properties); predicting network statistics based on the content streaming segment (e.g., with a network characterizer, for a subsequent content segment); determining a content segment cluster (e.g., based on the content properties, with the content congregator) and/or determining content properties (e.g., for the content); generating a normalized representation of the content player state (e.g., based on the content streaming segment(s) and/or player state data received from the content player); and feeding the network statistics, content segment cluster and/or content properties, and the player state(s) into the trained learning agent. The trained learning agent then determines an ABR selection and provides the ABR selection to an endpoint. The endpoint can be a content player (e.g., the content player that the real-world content streaming segment(s) were received from), the simulator (e.g., that the simulated content streaming segment(s) were received from), or any other suitable endpoint. The endpoint can optionally play the successive content segments using the selected ABR (or simulate content playback using the selected ABR), and can optionally determine and provide feedback (e.g., a QoE score). The QoE score and/or the analyzed content segment(s) can be subsequently used to retrain or update the trained learning agent, or otherwise used.

Figure 4:
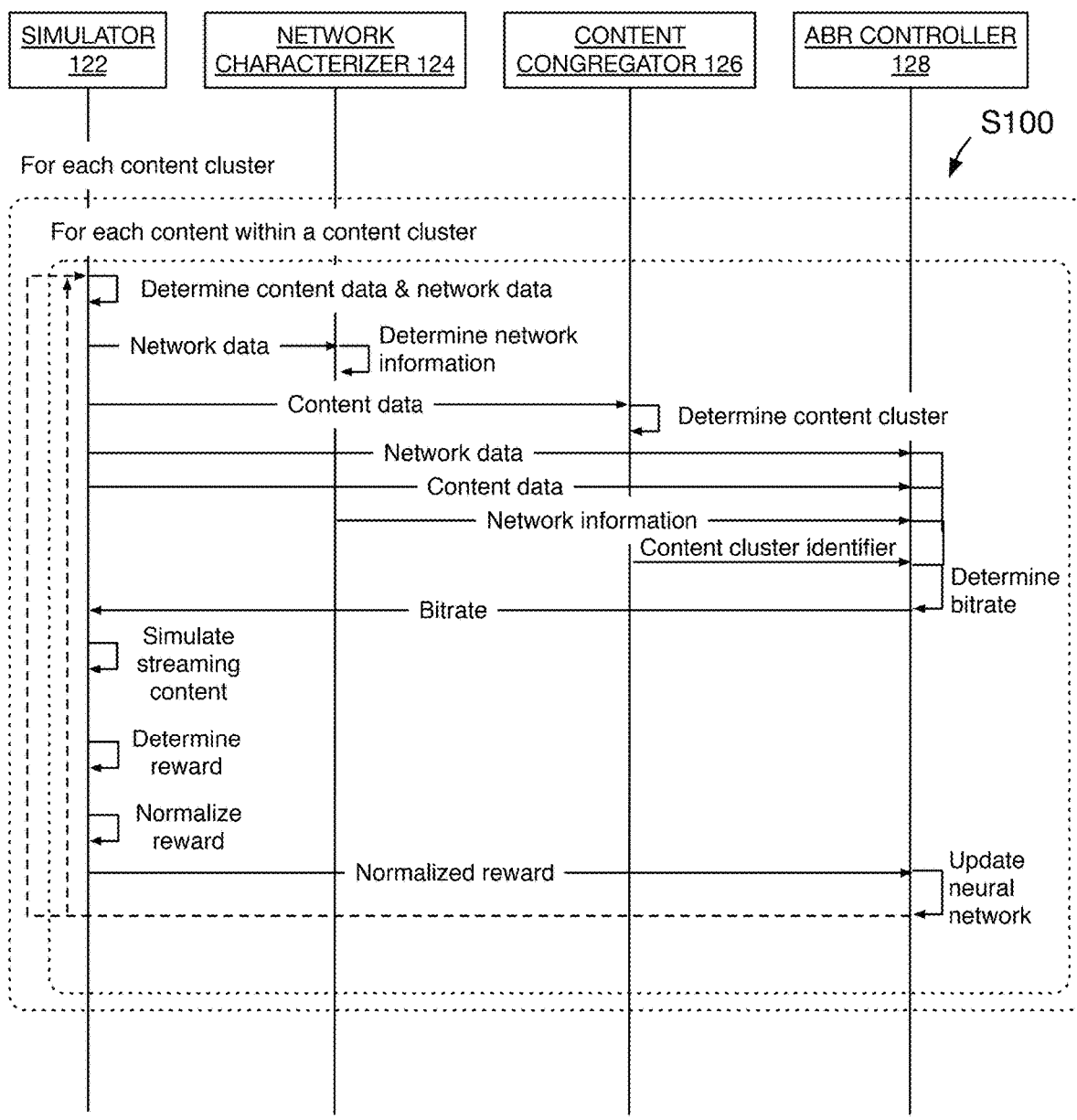
FIG. 4 is a schematic representation of an example of training an ABR controller.
Figure 6A:
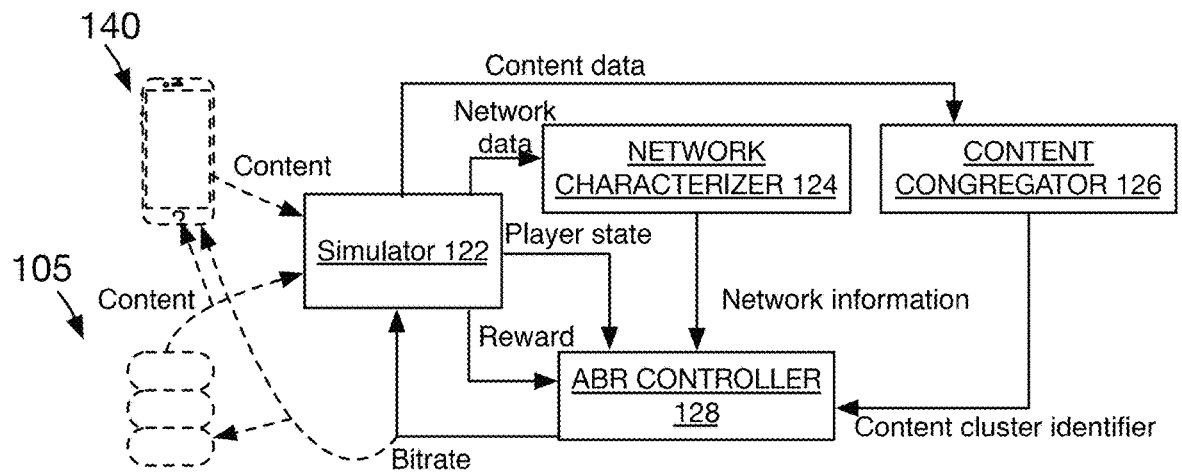
FIGS. 6A and 6B are schematic representations of examples of training an ABR controller.
Figure 6B:
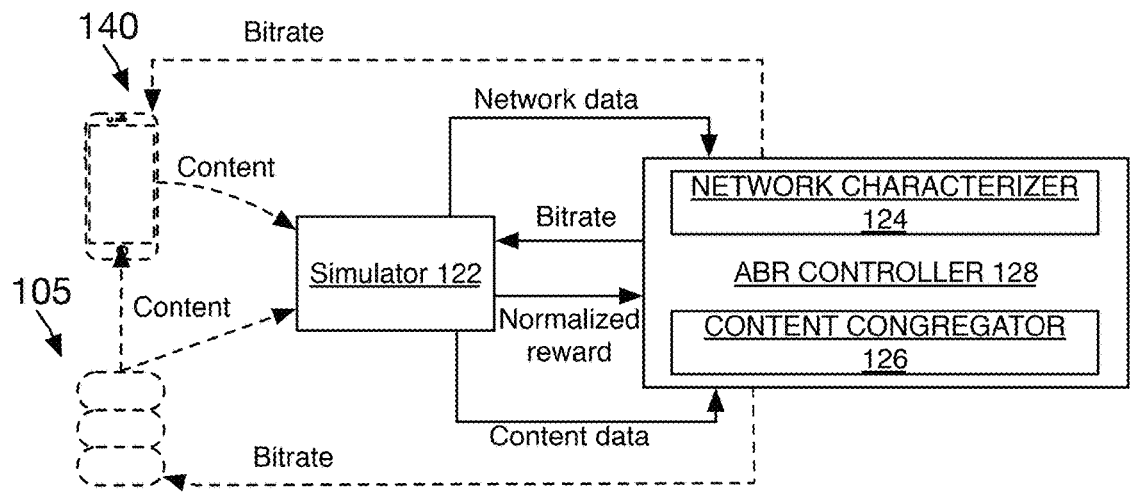

In a second specific example, as shown in FIGS. 4, 6A & 6B, the ABR controller can be trained based on a set of content (e.g., a set of training content). The training content can include real content and/or simulated content. The training content network information (e.g., network information) can be determined at a network characterizer. In this specific example, the network characterizer can be trained to determine the training content network information (e.g., predict future network information based on previous network information). The training content can be clustered into a set of training content clusters, each associated with a training content cluster identifier. In this specific example, the content congregator can be trained to determine what cluster the training content is associated with and/or what/how many clusters should be prepared. For each content in the set of training content, the training content network information, training content network meta-data, training content meta-data, and training content cluster identifier (e.g., cluster identifier) can be sent to the ABR controller. The ABR controller can determine bitrates for each of the training content (e.g., for each segment of each training content) based on the training content network information, training content network meta-data, training content meta-data, and training content cluster identifier. The ABR controller can transmit the bitrate to a simulator. The simulator can simulate streaming the content and/or an upcoming segment of the content (e.g., using the bitrate, network scenario, content meta-data, etc.) and determine a reward (e.g., a quality of experience score) for the bitrate. The simulator can normalize the reward based on the network meta-data and/or content meta-data. Using reinforcement learning, the ABR controller can be trained based on the normalized reward. The same training content can be used more than once for training the ABR controller; however, training content can be used only once. In specific embodiments of this example, the ABR controller can be trained iteratively (e.g., training repeated) for each content (e.g., within each content cluster) to train a single ABR controller; however, separate ABR controllers for each content cluster can be trained, and/or the ABR controller(s) can have any suitable configuration. However, the ABR controller can be otherwise suitably trained.

Figure 7A:
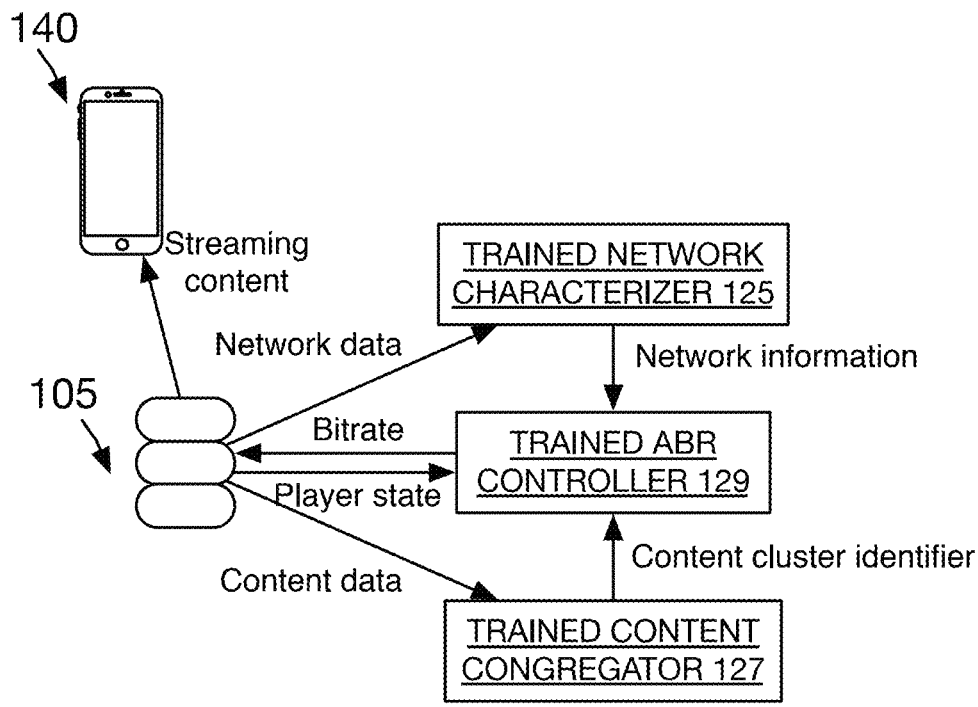
FIGS. 7A and 7B are schematic representations of examples of determining a streaming bitrate.
Figure 7B:
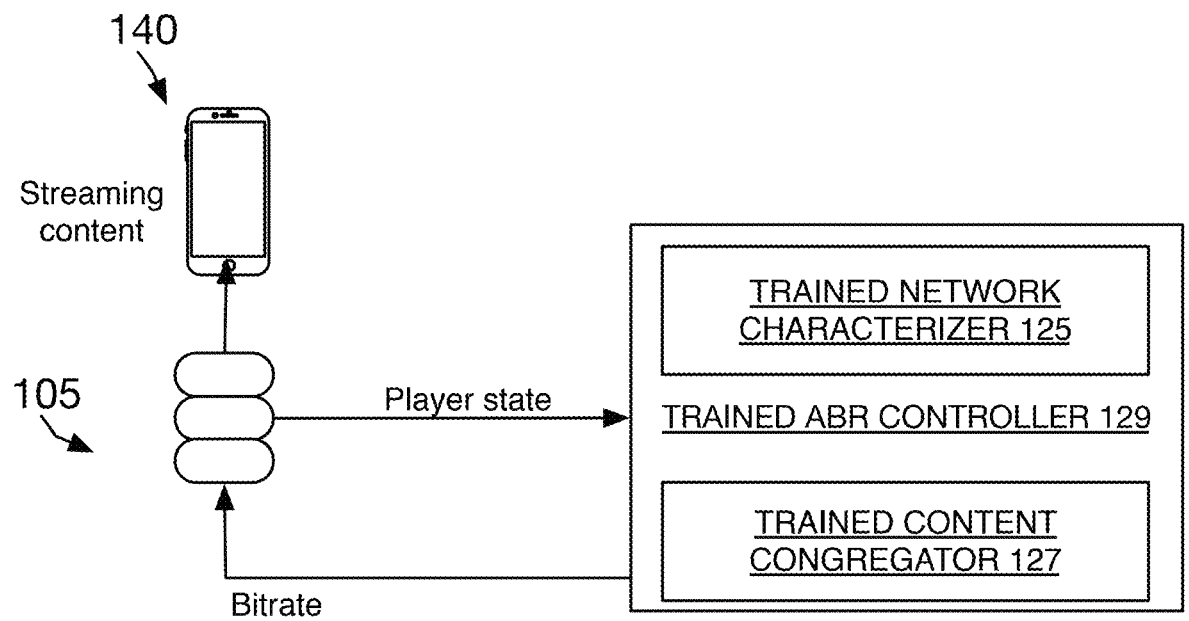

In a third specific example, as shown in FIGS. 7A and 7B, streaming content can be started (e.g., from at a user device, from an OTT server, from a content streaming service, etc.). The network data associated with the streaming content can be sent to a network characterizer (e.g., a trained network characterizer 125, the network characterizer used during ABR controller training, etc.). The network characterizer can determine the network information and network meta-data. The content data can be sent to a content congregator (e.g., a trained content congregator 127, the content congregator used during ABR controller training, etc.). The content congregator can determine the cluster (e.g., content cluster identifier) that the streaming content corresponds to. An ABR controller can receive the network information, network meta-data, content cluster identifier, and content data (e.g., from a user device, from an OTT server, from a content streaming service, from network characterizer, from content congregator, etc.). The ABR controller can previously have been trained (e.g., as described above). The trained ABR controller 129 can determine a streaming bitrate based on the network information, network meta-data, content cluster information, and content data. The ABR controller can send the streaming bitrate (e.g., to the user device, to the OTT server, to the content streaming service, etc.). The content (e.g., subsequent content segment) can be streamed at the streaming bitrate. The content streaming data can optionally be stored (e.g., in the training data repository) and/or used to further train the ABR controller (e.g., by computing a reward at the same time as the content is streamed, by receiving a reward based on the user experience, etc.). However, the streaming bitrate can be determined and/or used in any suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for training an adaptive bitrate (ABR) controller comprising:
    retrieving content metadata for a content cluster, the content metadata comprising a bitrate ladder, a segment size, and a playback buffer, wherein the content cluster includes multiple segments of different bitrates and segment sizes, wherein multiple content clusters correspond to a larger content available for streaming to a client;
    determining a network scenario for the streaming to the client based on received network information, wherein the network information includes throughput, and wherein the determined network scenario is one of multiple possible network scenarios that account for client mobility; and
    for each content segment within a given content cluster:
        at the ABR controller, determining a content bitrate based on the content metadata and the determined network scenario;
        determining a reward associated with the content bitrate for the respective content segment and network scenario, wherein the reward comprises a quality of experience score for streaming the content segment with the content bitrate;
        normalizing the reward based on the network information and content metadata to generate a normalized reward, wherein the normalizing differs between mobile and stationary network scenarios; and
        using reinforcement learning, training the ABR controller based on the normalized reward to increase the quality of experience when choosing bit rates for the content segment in the possible network scenarios.

2. The method of claim 1, further comprising a content congregator, separate from the ABR controller, that is trained to cluster the content segments of the larger content into content clusters.

3. The method of claim 1, wherein each content cluster is associated with a different a content cluster identifier, wherein the content within a given content cluster is associated with the respective content cluster identifier, and wherein determining a content bitrate is based on the content cluster identifier.

4. The method of claim 1, wherein a network characterizer is trained to determine the network information associated with streaming upcoming segments of the content, wherein determining the network information is based on at least one previous segment of the content.

5. The method of claim 4, wherein the network information comprises first statistical moment information and second statistical moment information associated with streaming the training content.

6. The method of claim 1, wherein determining the reward comprises, at a simulator:
    generating a simulation of content streaming based on the content bitrate; and
    calculating the quality of experience score based on the simulation.

7. The method of claim 6, wherein the network information is continuously determined during content streaming simulation, wherein the network information comprises:
    historic network throughput measurements for the content;
    download time for the content;
    number of segments remaining for the content;
    a current buffer level; and
    a prior bitrate.

8. A method for determining a content streaming bitrate for streaming content, comprising:
    determining a network scenario based on network data associated with streaming the content, wherein the network data includes throughput, and wherein the determined network scenario is one of multiple possible network scenarios that account for client mobility;
    determining content data based on the content, the content data comprising a bitrate ladder, a segment size, and a playback buffer;
    at an adaptive bitrate (ABR) controller, for each segment of the content, determining a content streaming bitrate based on the network scenario and the content data, wherein the ABR controller is trained to increase the quality of experience when choosing bit rates for the content segment in the possible network scenarios by:
        clustering training content into training content clusters;
        for each training content within a given training content cluster:
            determining training network data associated with the training content;
            determining a training content bitrate based on the training network data and training content data from the training content;
            determining a normalized reward associated with the training content bitrate based on the training network data and training content data, wherein the normalizing differs between mobile and stationary network scenarios; and
            using reinforcement learning, training the ABR controller based on the normalized reward.

9. The method of claim 8, wherein determining the content streaming bitrate further comprises:
    for a first set of segments of the content, determining a conservative bitrate, wherein the conservative bitrate is determined to prevent content rebuffering before a target time; and for a second set of segments of the content occurring after the first set of segments of the content, determining an aggressive bitrate higher than the conservative bitrate, wherein the aggressive bitrate is determined to maximize a content quality.

10. The method of claim 9, wherein the target time is determined using at least one of: minimizing a rebuffering duration, maximizing a duration of time since playback start, and maximizing a duration since a last rebuffering.

11. The method of claim 8, wherein the training network data comprises training network metadata and training network information, wherein determining the training network data comprises determining the training network information, associated with streaming upcoming segments of the training content, based on at least one previous segment of the training content using a trained network characterizer.

12. The method of claim 11, wherein the training network information comprises first statistical moment information and second statistical moment information associated with streaming the training content.

13. The method of claim 8, wherein the ABR controller is iteratively trained for each training content within the training content cluster, wherein iteratively training the ABR controller generates a single ABR controller.

14. The method of claim 13, wherein clustering the training content comprises clustering the training content into the training content clusters based on at least one of the training content data and the training network data, the training content data comprising a bitrate ladder, a segment size, and a playback buffer.

15. The method of claim 14, wherein the training content is clustered using a content congregator, separate from the ABR controller, that is trained to cluster the set of training content into the training content clusters.

16. The method of claim 14, wherein each training content cluster is associated with a training content cluster identifier, and wherein determining the training content bitrate is based on the training content cluster identifier.

17. The method of claim 16, wherein the content is associated with a content cluster, wherein the content cluster is associated with one of the training content cluster identifiers, and wherein the content streaming bitrate is determined based on the training content cluster identifier.

18. The method of claim 8, wherein determining the normalized reward comprises determining the normalized reward based on a quality of experience score for the training content and the respective training content data.

* * * * *